United States Patent
Blomberg et al.

(10) Patent No.: US 11,188,878 B2
(45) Date of Patent: Nov. 30, 2021

(54) MEETING ROOM RESERVATION SYSTEM

(71) Applicant: INTERNATIONAL BUSINESS MACHINES CORPORATION, Armonk, NY (US)

(72) Inventors: Jeanette L. Blomberg, Portola Valley, CA (US); Anca A. Chandra, Los Gatos, CA (US); Pawan R. Chowdhary, San Jose, CA (US); Susanne M. Glissmann-Hochstein, San Jose, CA (US); Sunhwan Lee, Menlo Park, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 14/861,959

(22) Filed: Sep. 22, 2015

(65) Prior Publication Data

US 2017/0083872 A1    Mar. 23, 2017

(51) Int. Cl.
*G06Q 10/10* (2012.01)
(52) U.S. Cl.
CPC .............. *G06Q 10/1095* (2013.01)
(58) Field of Classification Search
None
See application file for complete search history.

(56) References Cited

U.S. PATENT DOCUMENTS

| | | | | |
|---|---|---|---|---|
| 4,937,743 A | * | 6/1990 | Rassman | G06Q 10/06 705/7.22 |
| 5,050,077 A | * | 9/1991 | Vincent | G06Q 10/1095 705/7.19 |
| 5,369,570 A | * | 11/1994 | Parad | G06Q 10/06 705/7.13 |

(Continued)

FOREIGN PATENT DOCUMENTS

| | | |
|---|---|---|
| CN | 103886447 A | 6/2014 |
| JP | 201361929 A | 4/2013 |

OTHER PUBLICATIONS

Stochastic, Wikipedia webpages, archives org, Jul. 10, 2017 https://web.archive.org/web/20170710014919/https://en.wikipedia.org/wiki/Stochastic (Year: 2017).*

(Continued)

*Primary Examiner* — Octavian Rotaru
(74) *Attorney, Agent, or Firm* — Sherman IP LLP; Kenneth L. Sherman; Hemavathy Perumal

(57) ABSTRACT

Embodiments of the present invention provide a method comprising maintaining historical meeting information, receiving an event data stream corresponding to a meeting, and delaying confirmation of an assignment of a meeting room for the meeting for a period of delay defined by a confirmation condition to predict a number of in-person attendees at the meeting based on the event data stream and the historical meeting information. The meeting room is tentatively assigned to the meeting based on the predicted number of in-person attendees. The method further com- (Continued)

prises sending confirmation of the assignment of the meeting room for the meeting to at least one invitee only after the period of delay has elapsed.

25 Claims, 10 Drawing Sheets

(56) References Cited

U.S. PATENT DOCUMENTS

| | | | | |
|---|---|---|---|---|
| 6,101,480 | A * | 8/2000 | Conmy | G06Q 10/109 705/7.18 |
| 6,263,358 | B1 * | 7/2001 | Lee | G06F 8/458 718/100 |
| 6,640,230 | B1 * | 10/2003 | Alexander | G06Q 10/107 |
| 7,027,995 | B2 * | 4/2006 | Kaufman | G06Q 10/109 705/7.12 |
| 7,082,402 | B2 * | 7/2006 | Conmy | G06F 40/151 705/7.19 |
| 7,188,073 | B1 * | 3/2007 | Tam | G06Q 10/02 705/7.16 |
| 7,343,312 | B2 * | 3/2008 | Capek | G06Q 10/109 705/7.19 |
| 7,395,221 | B2 * | 7/2008 | Doss | G06Q 10/06314 705/7.19 |
| 7,421,401 | B2 * | 9/2008 | Demsky | G06Q 10/1095 379/202.01 |
| 7,440,747 | B2 * | 10/2008 | Takaki | G06Q 10/109 455/412.2 |
| 7,847,686 | B1 * | 12/2010 | Atkins | H04W 4/027 340/539.13 |
| 8,077,635 | B2 * | 12/2011 | Shaffer | H04Q 3/0062 370/260 |
| 8,145,536 | B1 * | 3/2012 | Goel | G06Q 10/025 705/26.1 |
| 8,200,520 | B2 * | 6/2012 | Chen | G06Q 10/06312 705/7.19 |
| 8,346,589 | B1 * | 1/2013 | Norton | G06Q 10/1093 705/7.18 |
| 8,352,296 | B2 * | 1/2013 | Taneja | G06Q 10/109 705/5 |
| 8,797,159 | B2 * | 8/2014 | Kirkpatrick | G08B 13/189 340/541 |
| 8,954,968 | B1 * | 2/2015 | Pohl | G06F 11/3404 718/100 |
| 9,626,659 | B2 * | 4/2017 | Bathiya | G06Q 10/109 |
| 9,721,233 | B2 * | 8/2017 | Norton | G06Q 10/06314 |
| 2001/0037229 | A1 * | 11/2001 | Jacobs | G06Q 10/063112 705/7.14 |
| 2002/0131565 | A1 * | 9/2002 | Scheuring | G06Q 10/109 379/88.19 |
| 2002/0188490 | A1 * | 12/2002 | Kruse | G06Q 10/109 705/5 |
| 2003/0004840 | A1 * | 1/2003 | Gharavy | G06Q 10/06398 705/30 |
| 2003/0097283 | A1 * | 5/2003 | Kimura | G06Q 20/10 705/5 |
| 2003/0126205 | A1 * | 7/2003 | Lurie | G06Q 30/0282 709/204 |
| 2003/0149605 | A1 * | 8/2003 | Cragun | G06Q 10/1095 705/7.13 |
| 2003/0149606 | A1 * | 8/2003 | Cragun | G06Q 10/109 705/7.19 |
| 2003/0204474 | A1 * | 10/2003 | Capek | G06Q 20/382 705/64 |
| 2004/0064355 | A1 * | 4/2004 | Dorenbosch | G06Q 10/1095 705/7.19 |
| 2004/0093290 | A1 * | 5/2004 | Doss | G06Q 10/1095 705/35 |
| 2004/0215592 | A1 * | 10/2004 | Matsuura | G06Q 10/109 |
| 2004/0260659 | A1 * | 12/2004 | Chan | G06Q 30/0283 705/400 |
| 2004/0267567 | A1 * | 12/2004 | Barrera | G06Q 10/087 705/2 |
| 2005/0060211 | A1 * | 3/2005 | Xiao | G06Q 10/025 705/6 |
| 2005/0071213 | A1 * | 3/2005 | Kumhyr | G06Q 10/0631 705/7.12 |
| 2005/0154620 | A1 * | 7/2005 | Hentschel | G06Q 10/025 705/5 |
| 2005/0187808 | A1 * | 8/2005 | Adamson | G06Q 10/025 705/5 |
| 2005/0273372 | A1 * | 12/2005 | Bowne | G06Q 10/10 705/5 |
| 2006/0010023 | A1 * | 1/2006 | Tromczynski | G06Q 10/1095 705/7.25 |
| 2006/0015376 | A1 * | 1/2006 | Sattler | G06Q 10/06 705/5 |
| 2006/0035205 | A1 * | 2/2006 | Dobson | G07C 9/28 434/350 |
| 2006/0045030 | A1 * | 3/2006 | Bieselin | H04L 12/1818 370/260 |
| 2006/0047557 | A1 * | 3/2006 | Bieselin | H04L 12/1818 705/7.18 |
| 2006/0067250 | A1 * | 3/2006 | Boyer | H04M 3/42365 370/260 |
| 2006/0105315 | A1 * | 5/2006 | Shaver | G06Q 10/06315 434/362 |
| 2006/0149566 | A1 * | 7/2006 | Lin | G06Q 10/08 705/22 |
| 2006/0167731 | A1 * | 7/2006 | Nishimura | G06Q 10/1095 705/7.19 |
| 2006/0171337 | A1 * | 8/2006 | Shaffer | H04L 12/1818 370/261 |
| 2006/0224969 | A1 * | 10/2006 | Marston | G06Q 10/109 715/753 |
| 2006/0271419 | A1 * | 11/2006 | O'Sullivan | G06Q 10/06 705/7.13 |
| 2006/0293943 | A1 * | 12/2006 | Tischhauser | G06Q 10/06314 705/7.24 |
| 2007/0044099 | A1 * | 2/2007 | Rajput | G06F 9/5027 718/102 |
| 2007/0071209 | A1 * | 3/2007 | Horvitz | G06Q 10/109 379/201.06 |
| 2007/0162315 | A1 * | 7/2007 | Hodges | G06Q 10/0631 705/7.12 |
| 2007/0226035 | A1 * | 9/2007 | Doss | G06Q 40/00 705/7.19 |
| 2007/0250366 | A1 * | 10/2007 | Nurmi | G06Q 10/1095 705/7.19 |
| 2007/0271123 | A1 * | 11/2007 | Miyashita | G06Q 10/02 705/5 |
| 2007/0288291 | A1 * | 12/2007 | Earle | G06Q 10/109 705/7.13 |
| 2008/0021760 | A1 * | 1/2008 | Doss | G06Q 10/1095 705/7.19 |
| 2008/0114716 | A1 * | 5/2008 | Mock | G06Q 10/109 |
| 2008/0114840 | A1 * | 5/2008 | Rollin | G06Q 10/06311 709/206 |
| 2008/0126948 | A1 * | 5/2008 | Daniels | G06Q 10/107 715/751 |
| 2008/0133282 | A1 * | 6/2008 | Landar | G06Q 10/1095 705/5 |
| 2008/0133515 | A1 * | 6/2008 | Chien | G06Q 10/06 |
| 2008/0162198 | A1 * | 7/2008 | Jabbour | G06Q 10/10 705/5 |
| 2008/0167937 | A1 * | 7/2008 | Coughlin | G06Q 10/1095 705/7.16 |
| 2008/0228547 | A1 * | 9/2008 | Doss | G06Q 10/109 705/7.19 |
| 2008/0291021 | A1 * | 11/2008 | Bhogal | G07C 9/28 340/572.1 |
| 2008/0306797 | A1 * | 12/2008 | Fayaz | G06Q 10/02 705/7.22 |
| 2009/0006161 | A1 * | 1/2009 | Chen | G06Q 10/1095 705/7.19 |
| 2009/0024439 | A1 * | 1/2009 | Ryan | G06Q 10/109 705/7.19 |

(56) References Cited

U.S. PATENT DOCUMENTS

| | | | |
|---|---|---|---|
| 2009/0030609 A1* | 1/2009 | Orttung | G01C 21/00 701/469 |
| 2009/0030769 A1* | 1/2009 | Orttung | G06Q 10/1093 705/7.16 |
| 2009/0055236 A1* | 2/2009 | O'Sullivan | G06Q 10/00 705/7.16 |
| 2009/0089342 A1* | 4/2009 | Runstedler | G06F 16/27 |
| 2009/0094088 A1* | 4/2009 | Chen | G06Q 10/06314 705/7.19 |
| 2009/0112984 A1* | 4/2009 | Anglin | G06Q 10/1095 709/204 |
| 2009/0165022 A1* | 6/2009 | Madsen | G06Q 10/109 719/318 |
| 2009/0177503 A1* | 7/2009 | Kawano | G06Q 10/02 705/5 |
| 2009/0192861 A1* | 7/2009 | Suzuki | G06Q 10/1095 705/7.19 |
| 2009/0204714 A1* | 8/2009 | Ferrara | G06Q 10/10 709/228 |
| 2009/0217176 A1* | 8/2009 | Coulomb | G06Q 10/109 715/751 |
| 2009/0237488 A1* | 9/2009 | Shudo | G06Q 10/02 348/14.01 |
| 2009/0276498 A1* | 11/2009 | Lyle | G06Q 10/109 709/206 |
| 2009/0287629 A1* | 11/2009 | Gabriel | G06Q 10/02 706/47 |
| 2009/0292566 A1* | 11/2009 | Bossert | G06Q 10/02 705/5 |
| 2009/0313325 A1* | 12/2009 | Vanecek | G06Q 50/01 709/203 |
| 2009/0327227 A1* | 12/2009 | Chakra | H04L 12/1818 |
| 2010/0017245 A1* | 1/2010 | Kristiansen | G06Q 10/02 705/5 |
| 2010/0070314 A1* | 3/2010 | Jethani | G06Q 10/109 705/6 |
| 2010/0081457 A1* | 4/2010 | Jerome | H04L 12/1818 455/456.3 |
| 2010/0088143 A1* | 4/2010 | Platt | G06Q 10/109 705/7.18 |
| 2010/0114614 A1* | 5/2010 | Sharpe | G06Q 10/109 705/5 |
| 2010/0125478 A1* | 5/2010 | Bisht | H04W 4/33 705/7.19 |
| 2010/0131328 A1* | 5/2010 | DeLugas | G06Q 10/00 705/80 |
| 2010/0153160 A1* | 6/2010 | Bezemer | G06Q 10/0631 705/7.12 |
| 2010/0191549 A1* | 7/2010 | Toyama | G06Q 30/0601 705/5 |
| 2010/0212675 A1* | 8/2010 | Walling | G16H 40/67 128/898 |
| 2010/0241483 A1* | 9/2010 | Haynes | G06Q 10/109 705/7.18 |
| 2010/0250270 A1* | 9/2010 | Naji | G06Q 10/109 705/2 |
| 2010/0262926 A1* | 10/2010 | Gupta | G06Q 10/109 715/764 |
| 2010/0267399 A1* | 10/2010 | Sweeney | H04W 4/02 455/456.3 |
| 2010/0274855 A1* | 10/2010 | Wassingbo | G06Q 10/109 709/206 |
| 2010/0293029 A1* | 11/2010 | Olliphant | G06Q 10/109 705/7.19 |
| 2010/0315483 A1* | 12/2010 | King | H04N 7/147 348/14.08 |
| 2010/0325205 A1* | 12/2010 | Murphy | G06Q 10/10 709/204 |
| 2011/0069141 A1* | 3/2011 | Mitchell | H04N 7/15 348/14.09 |
| 2011/0157366 A1* | 6/2011 | Padmanabh | G08B 13/196 348/159 |
| 2011/0161130 A1* | 6/2011 | Whalin | G06Q 30/02 705/7.18 |
| 2011/0184768 A1* | 7/2011 | Norton | G06Q 10/109 705/5 |
| 2011/0252097 A1* | 10/2011 | Walker | G06Q 10/06 709/206 |
| 2011/0279631 A1* | 11/2011 | Ranganath | H04N 7/142 348/14.08 |
| 2012/0179980 A1* | 7/2012 | Whalin | G06Q 30/02 715/753 |
| 2012/0179981 A1* | 7/2012 | Whalin | H04W 4/21 715/753 |
| 2012/0185291 A1* | 7/2012 | Ramaswamy | G06Q 10/1095 705/7.19 |
| 2012/0191489 A1* | 7/2012 | Takahashi | G06Q 10/02 705/5 |
| 2012/0293605 A1* | 11/2012 | Seferian | H04L 65/607 348/14.08 |
| 2013/0038673 A1* | 2/2013 | Hiller | H04L 12/1827 348/14.07 |
| 2013/0117058 A1* | 5/2013 | Norton | G06Q 10/06311 705/7.16 |
| 2013/0117059 A1* | 5/2013 | Norton | G06Q 10/06314 705/7.18 |
| 2013/0211980 A1* | 8/2013 | Heiferman | G06Q 50/01 705/30 |
| 2013/0212494 A1* | 8/2013 | Heiferman | H04L 51/00 715/753 |
| 2013/0218982 A1* | 8/2013 | Hymel | H04L 51/08 709/206 |
| 2013/0254279 A1* | 9/2013 | Bentley | G06F 16/9535 709/204 |
| 2013/0254708 A1* | 9/2013 | Dorcey | H04L 51/04 715/788 |
| 2013/0263020 A1* | 10/2013 | Heiferman | H04L 12/1818 715/753 |
| 2013/0304533 A1* | 11/2013 | Nudd | G06Q 10/063118 705/7.15 |
| 2013/0317874 A1* | 11/2013 | Kozloski | G06Q 10/109 705/7.19 |
| 2013/0318161 A1* | 11/2013 | Sakamoto | H04L 12/1818 709/204 |
| 2014/0019536 A1* | 1/2014 | Christensen | H04L 12/1818 709/204 |
| 2014/0039962 A1* | 2/2014 | Nudd | G06Q 10/1097 705/7.21 |
| 2014/0091928 A1* | 4/2014 | Conzola | G06Q 10/0631 340/541 |
| 2014/0136439 A1* | 5/2014 | Galvin, Jr. | G06Q 10/063118 705/321 |
| 2014/0149519 A1* | 5/2014 | Redfern | H04L 65/403 709/206 |
| 2014/0257883 A1* | 9/2014 | Thompson | G06Q 10/02 705/5 |
| 2014/0278683 A1* | 9/2014 | Kennell | G06Q 10/1053 705/7.19 |
| 2014/0379404 A1* | 12/2014 | Bastide | G06Q 10/1095 705/7.19 |
| 2015/0006217 A1* | 1/2015 | Buehl | G06Q 10/1095 705/7.19 |
| 2015/0112738 A1* | 4/2015 | Marinaro | G06Q 10/02 705/5 |
| 2015/0134389 A1* | 5/2015 | Punera | G06Q 10/063114 705/7.15 |
| 2015/0142895 A1* | 5/2015 | Beran | G06Q 10/1095 709/206 |
| 2015/0149231 A1* | 5/2015 | Nicolas | H04W 4/02 705/7.19 |
| 2015/0170045 A1* | 6/2015 | Kirkham | G06Q 10/06 706/11 |
| 2015/0193739 A1* | 7/2015 | Min | G06Q 10/1095 705/7.19 |
| 2015/0193819 A1* | 7/2015 | Chang | G06Q 10/1095 705/7.19 |
| 2015/0314454 A1* | 11/2015 | Breazeal | B25J 9/0003 700/259 |

(56) References Cited

U.S. PATENT DOCUMENTS

| | | | | |
|---|---|---|---|---|
| 2015/0362909 | A1* | 12/2015 | McReynolds | G06Q 50/10 700/275 |
| 2016/0005005 | A1* | 1/2016 | Dhara | H04L 65/403 705/7.19 |
| 2016/0071114 | A1* | 3/2016 | Gerdisch | G06Q 30/018 705/2 |
| 2016/0088435 | A1* | 3/2016 | Weksler | H04M 1/72457 455/414.2 |
| 2016/0104094 | A1* | 4/2016 | Yom-Tov | G06Q 10/109 705/7.41 |
| 2016/0124908 | A1* | 5/2016 | Cecchi | G06F 40/30 704/9 |
| 2016/0148165 | A1* | 5/2016 | Prempeh | G06Q 10/1095 705/7.19 |
| 2016/0180259 | A1* | 6/2016 | Marianko | H04L 51/043 705/5 |
| 2016/0307167 | A1* | 10/2016 | Bathiya | H04L 51/046 |
| 2016/0321616 | A1* | 11/2016 | Gedge | G06F 16/24578 |
| 2016/0350720 | A1* | 12/2016 | Moorjani | G06Q 10/1095 |
| 2016/0350721 | A1* | 12/2016 | Comerford | G06Q 10/1093 |
| 2016/0358065 | A1* | 12/2016 | Gedge | G06N 7/00 |
| 2016/0364698 | A1* | 12/2016 | Bouz | G06Q 10/1095 |
| 2016/0379171 | A1* | 12/2016 | Gatzke | G06Q 10/109 705/7.19 |
| 2017/0006162 | A1* | 1/2017 | Bargetzi | H04W 4/06 |
| 2017/0026806 | A1* | 1/2017 | Jampani | G01S 5/02 |
| 2017/0068906 | A1* | 3/2017 | Korycki | G06Q 10/107 |
| 2017/0083210 | A1* | 3/2017 | Parker | H04L 12/1822 |
| 2017/0098197 | A1* | 4/2017 | Yu | G06Q 30/02 |
| 2017/0310716 | A1* | 10/2017 | Lopez Venegas | G06Q 10/1093 |
| 2018/0349086 | A1* | 12/2018 | Chakra | H04W 64/00 |

OTHER PUBLICATIONS

Manna et al Learning Occupancy in Single Person Offices with Mixtures of Multi-lag Markov Chains IEEE 25 International Conference on Tools with with Artificial Intelligence p. 151-158, 2013 https://ieeexplore.ieee.org/abstract/document/6735243 (Year: 2013).*

Remarks by Director Iancu at the Artificial Intelligence Intellectual Property Considerations event Jan. 31, 2019 https://www.uspto.gov/about-us/news-updates/remarks-director-iancu-artificial-intelligence-intellectual-property (Year: 2019).*

Anonymous, "Dynamic allocation of meeting rooms for multiple participants based on a combination of different attributes", Dec. 11, 2013, pp. 1-3, IP.com, United States.

* cited by examiner

| 411 | 412 | 413 | 414 | 415 | 416 | 417 | 418 |
|---|---|---|---|---|---|---|---|
| Event Stream ID | Event Type | Timestamp | Number of Invitees | Number of Positive Responses | Number of Negative Responses | Invitation Timestamp | Meeting Schedule Timestamp |

| Meeting ID | Meeting Type | User ID | Response | Invitation date | Response date | Meeting start date |
|---|---|---|---|---|---|---|
| M64 | brain storming | user8 | true | 12/9/2014 14:00 | 12/9/2014 15:00 | 12/16/2014 14:00 |
| M64 | brain storming | user0 | true | 12/9/2014 14:00 | 12/10/2014 15:00 | 12/16/2014 14:00 |
| M64 | brain storming | user11 | false | 12/9/2014 14:00 | 12/11/2014 11:00 | 12/16/2014 14:00 |
| M64 | brain storming | user13 | true | 12/9/2014 14:00 | 12/11/2014 11:00 | 12/16/2014 14:00 |
| M64 | brain storming | user16 | false | 12/9/2014 14:00 | 12/12/2014 10:00 | 12/16/2014 14:00 |
| M64 | brain storming | user18 | true | 12/9/2014 14:00 | 12/14/2014 12:00 | 12/16/2014 14:00 |
| M64 | brain storming | user7 | false | 12/9/2014 14:00 | 12/14/2014 15:00 | 12/16/2014 14:00 |
| M64 | brain storming | user10 | true | 12/9/2014 14:00 | 12/15/2014 10:00 | 12/16/2014 14:00 |
| M64 | brain storming | user17 | true | 12/9/2014 14:00 | 12/15/2014 15:00 | 12/16/2014 14:00 |

| Room ID | Capacity |
|---|---|
| Room 1, Room 2, Room 3 | 6 |
| Room 4, Room 5 | 8 |
| Room 6, Room 7, Room 8 | 10 |
| Room 9, Room 10 | 20 |

| Meeting ID | Room Capacity (Greedy) | # Participants | Waste (Greedy) | # Estimated Participants | Room Capacity (Stochastic) | Waste (Stochastic) |
|---|---|---|---|---|---|---|
| | | Greedy Approach | | | Stochastic Approach | |
| M0 | 10 | 2 | 8 | 4.44 | 6 | 4 |
| M28 | 20 | 5 | 15 | 5.62 | 6 | 1 |
| M17 | 8 | 3 | 5 | 4.03 | 6 | 3 |
| M39 | 20 | 4 | 16 | 4.03 | 6 | 2 |
| M27 | 10 | 5 | 5 | 5.77 | 6 | 1 |
| M47 | 20 | 5 | 15 | 8.29 | 10 | 5 |
| M52 | 20 | 3 | 17 | 4.30 | 6 | 3 |
| M36 | 8 | 3 | 5 | 4.26 | 6 | 3 |
| M1 | 20 | 5 | 15 | 7.17 | 8 | 3 |
| M30 | 6 | 2 | 4 | 2.00 | 6 | 4 |
| M40 | 10 | 4 | 6 | 6.43 | 8 | 4 |
| Average Waste | | | 10.09 | | | 3 |

Invitee values: M0: 9, M28: 13, M17: 7, M39: 11, M27: 10, M47: 14, M52: 13, M36: 8, M1: 14, M30: 5, M40: 10

FIG. 9

MEETING ROOM RESERVATION SYSTEM

The present invention generally relates to meeting room reservation systems, and more particularly, to a system, method and computer program product that allows a delayed meeting room assignment for a meeting, thereby enabling a prediction of number of in-person attendees at the meeting during the delay.

BACKGROUND

Conventional room reservation systems provide a required versus optional attendance choice, but not an in-person versus remote attendance choice, thereby resulting in overestimation of required room capacity. Further, room reservation systems typically assign requested room time slots on a first-come-first-served (FCFS) basis, resulting in unnecessary allocation of large capacity rooms to small meetings, and vice versa. For example, when there are more attendees than can be accommodated by an assigned room capacity, a last minute room reassignment is required which may be unsuccessful. Last minute room reassignments may also occur if some requested room time slots take precedence over others.

SUMMARY

Embodiments of the present invention provide a method comprising maintaining historical meeting information, receiving an event data stream corresponding to a meeting, and delaying confirmation of an assignment of a meeting room for the meeting for a period of delay defined by a confirmation condition to predict a number of in-person attendees at the meeting based on the event data stream and the historical meeting information. The meeting room is tentatively assigned to the meeting based on the predicted number of in-person attendees. The method further comprises sending confirmation of the assignment of the meeting room for the meeting to at least one invitee only after the period of delay has elapsed.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates an example event data stream, in accordance with an embodiment of the invention;

FIG. 4 illustrates an example database maintaining historical meeting information, in accordance with an embodiment of the invention;

FIG. 5 illustrates an example meeting room data structure, in accordance with an embodiment of the invention;

FIG. 9 illustrates an example table comparing a greedy approach and a stochastic approach to meeting room assignment, in accordance with an embodiment of the invention.

The detailed description explains the preferred embodiments of the invention, together with advantages and features, by way of example with reference to the drawings.

DETAILED DESCRIPTION

The present invention generally relates to meeting room reservation systems, and more particularly, to a system, method and computer program product that allows a delayed meeting room assignment for a meeting, thereby enabling a prediction of number of in-person attendees at the meeting during the delay. Embodiments of the present invention provide a method comprising maintaining historical meeting information, receiving an event data stream corresponding to a meeting, and delaying confirmation of an assignment of a meeting room for the meeting for a period of delay defined by a confirmation condition to predict a number of in-person attendees at the meeting based on the event data stream and the historical meeting information. The meeting room is tentatively assigned to the meeting based on the predicted number of in-person attendees. The method further comprises sending confirmation of the assignment of the meeting room for the meeting to at least one invitee only after the period of delay has elapsed.

Embodiments of the invention provide a meeting room reservation system that tentatively assigns and subsequently confirms (i.e., freezes) a meeting room assignment for a meeting based on a predicted number of in-person attendees at the meeting. The meeting room reservation system provides each invitee who receives an invitation for a meeting with multiple choices/options of attending the meeting, such as attending the meeting in-person (i.e., an in-person attendee) and at least one other mode of attendance (e.g., attending the meeting virtually via phone, computer, etc.). The meeting room reservation system is configured to predict the number of in-person attendees for a meeting based on one or more meeting invitation responses received from one or more invitees, and historical meeting information (e.g., electronic meeting invitations to meetings that occurred in the past, and meeting invitation responses received from invitees to the meetings).

Figure 1:
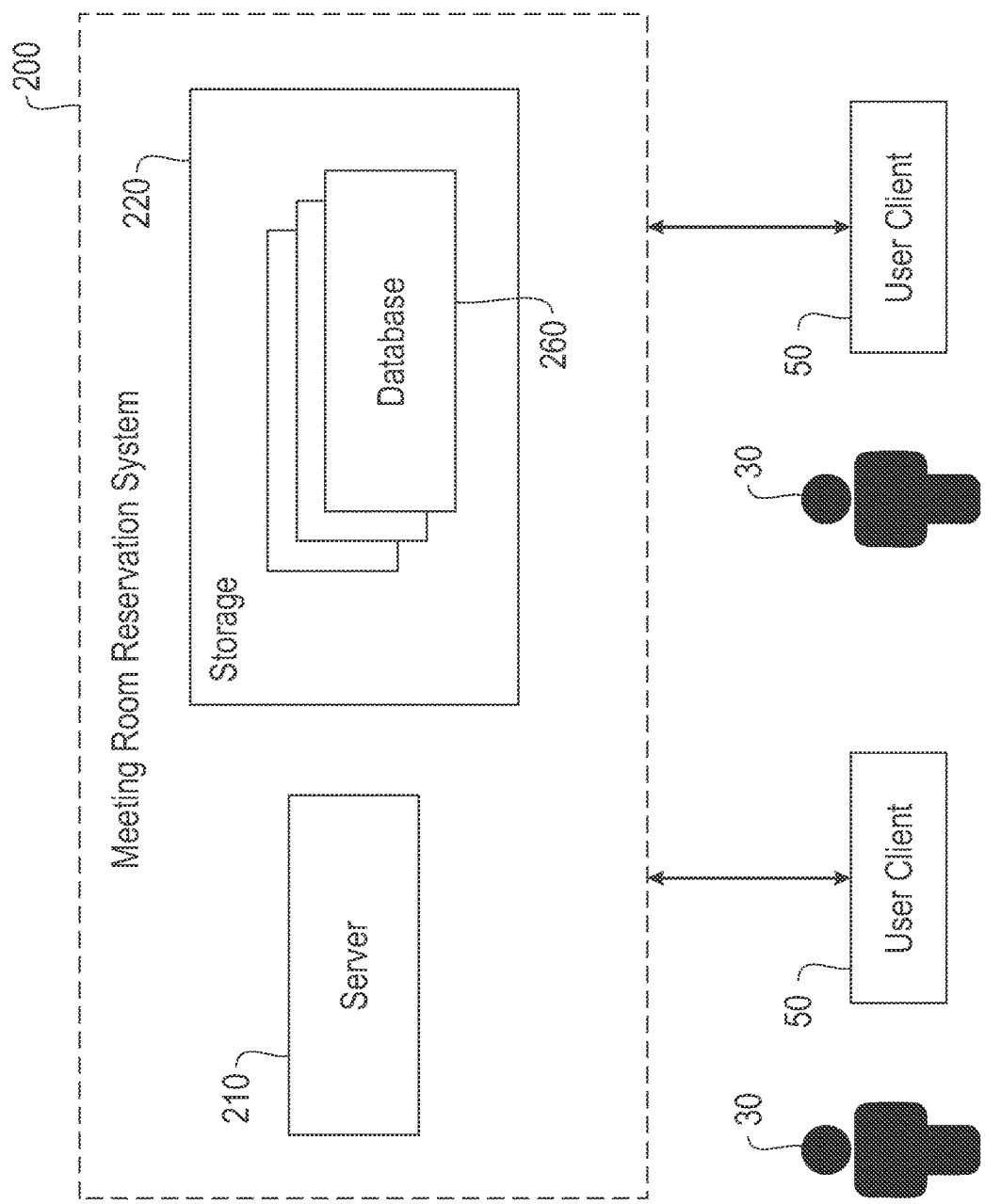
FIG. 1 illustrates an example meeting room reservation system, in accordance with an embodiment of the invention.

FIG. 1 illustrates an example meeting room reservation system 200, in accordance with an embodiment of the invention. The system 200 comprises one or more server devices 210, and one or more storage devices 220. The storage devices 220 may maintain one or more databases 260. As described in detail later herein, one or more application units may execute/operate on the server devices 210 to provide a meeting room reservation tool.

A user 30 may access the meeting room reservation tool (e.g., submit a meeting room reservation request) using an electronic user client device 50, such as a personal computer, or a mobile device (e.g., a laptop computer, a tablet, a mobile phone, etc.). In one embodiment, each user client device 50 exchanges data with the system 200 over a connection (e.g., a wireless connection, a wired connection, or a combination of the two).

Figure 2:
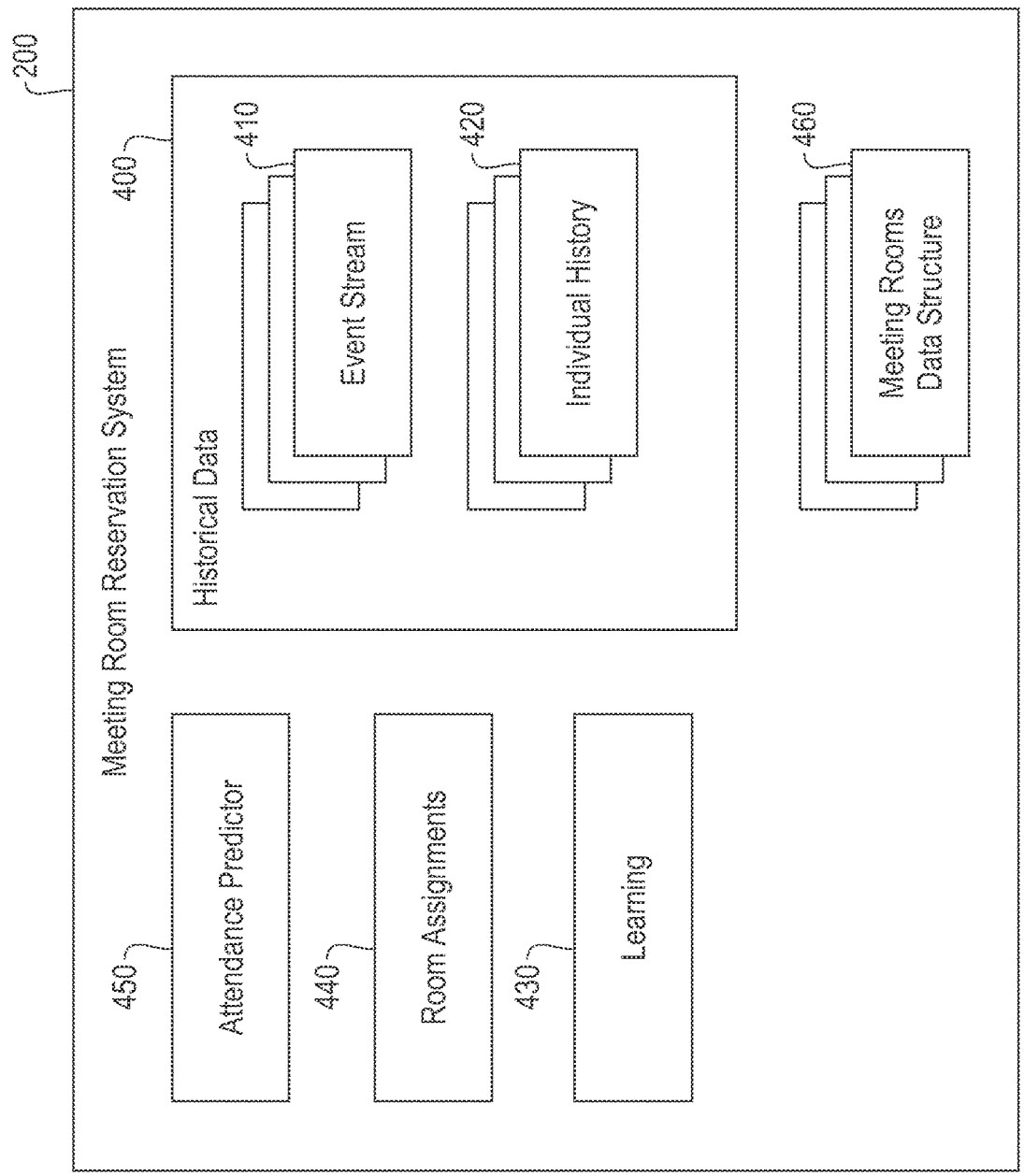
FIG. 2 illustrates the meeting room reservation system in detail, in accordance with an embodiment of the invention.

FIG. 2 illustrates the meeting room reservation system 200 in detail, in accordance with an embodiment of the invention. In one embodiment, the storage devices 220 (FIG. 1) maintains at least one database 400 maintaining historical meeting information (e.g., electronic meeting invitations to meetings that occurred in the past, and meeting invitation responses received from invitees to the meetings). In one example implementation, the historical meeting information includes a collection of historical event data streams 410. Each event data stream 410 corresponds to a meeting, and comprises information relating to the meeting, such as an electronic meeting invitation for the meeting and meeting invitation responses received from invitees to the meeting. The historical meeting information may also include a collection of individual history datasets 420, where each individual history dataset 420 corresponds to a user 30 (FIG. 1), and comprises information relating to different meetings the user 30 has previously been invited to, such as electronic meeting invitations to the different meetings, and meeting invitation responses received from the user.

In one embodiment, the storage devices 220 (FIG. 1) maintains a collection of meeting room data structures 460, where each meeting room data structure 460 corresponds to a set of different meeting rooms, and comprises information relating to the meeting rooms, such as a fixed room capacity of each meeting room and a calendar identifying days and times of meetings that have been assigned to the meeting room.

In one embodiment, the system 200 is configured to receive a meeting room reservation request for an upcoming/future meeting (e.g., a meeting not yet terminated or canceled) from a user 30. The system 200 is configured to provide, for each invitee to the meeting, multiple options of attending the meeting, such as attending the meeting in-person or attending the meeting virtually (e.g., via phone, computer, etc.). The system 200 receives, as input, an in-flight (i.e., current) event data stream 410 comprising information relating to the meeting, such as an electronic meeting invitation for the meeting and one or more meeting invitation responses received, up to a particular point in time, from one or more invitees to the meeting. For each meeting invitation meeting invitation response received from each invitee, the system 200 is configured to classify the meeting invitation meeting invitation response as one of the following: (1) a positive meeting invitation response indicating that the invitee has opted to attend the meeting in-person (i.e., the invitee is an in-person attendee), or (2) a negative meeting invitation response indicating that the invitee has opted to not attend the meeting in-person (i.e., the invitee is an absentee or will attend the meeting virtually via phone, computer, etc.).

The system 200 further comprises an attendance predictor module 450 configured to predict a number of in-person attendees for a meeting based on meeting invitation responses received from invitees to the meeting, and the historical meeting information maintained in database 400.

In one embodiment, the attendance predictor module 450 is produced by a learning unit 430 that applies machine learning to the historical meeting information maintained in database 400. Specifically, in a learning/training phase/stage, the learning unit 430 is configured to receive, as input, each of the following: (1) a pre-determined accuracy measure (e.g., precision), (2) a set (i.e., family) of segmentation algorithms, (3) a set of historical event data streams 410, (4) a confirmation interval function, and (5) a pre-determined minimum significant accuracy improvement threshold.

In one embodiment, in the learning/training phase/stage, the learning unit 430 is configured to select a best segmentation algorithm from the set of segmentation algorithms in accordance with a process 500 (FIG. 6) described in detail below. The pre-determined accuracy measure may be one of many standard measures (e.g., precision, recall, accuracy, etc.) that defines what qualifies as a best segmentation algorithm.

In one embodiment, the confirmation interval function (i.e., a confirmation condition) is a temporal condition representing a deadline by, or an interval during, which a meeting room tentatively assigned for a meeting must be confirmed. The confirmation interval function may be a function of a duration (i.e., period of delay) between when a meeting invitation to the meeting was sent and either when the meeting is scheduled to start or when a meeting room assignment for the meeting must be confirmed.

The set of segmentation algorithms are indexed by integers. Each segmentation algorithm satisfies the following condition: for each maximum number of events e, there is a maximum possible number of segments over all event data streams 410 included in the set of historical event data streams 410 with fewer than e events, where e is a positive integer.

In one example, a set/family of segmentation algorithms is created by an almost uniform partition that operates as follows: given an integer n, a duration to be segmented is divided into n equal parts, where any part with no events is merged with its predecessor. This results in a segmentation with at most e+1 segments created, where e denotes the number of events.

In another example, a set/family of segmentation algorithms is created by a partition of a duration into segments, where each segment has a fixed number n of time units (e.g., hours). Empty segments are merged with its predecessors, thereby guaranteeing that the segmentation cannot result in more segments than e+1, where e denotes the number of events. Further, for improved performance in the learning/training phase/stage, more complex merge operations may be performed to reduce the number of segments based on peak and trough numbers of events in segments.

In the learning/training phase/stage, the learning unit 430 is configured to produce, as output, each of the following: (1) the attendance predictor module 450, (2) the best segmentation algorithm, and (3) a required number of segments k. In one embodiment, there is a finite maximum for the required number of segments. The best segmentation algorithm and the required number of segments k are provided as input to the attendance predictor module 450 for use in predicting a number of in-person attendees for a meeting.

In one embodiment, the attendance predictor module 450 is configured to receive, as input, an in-flight (i.e., current) event data stream 410 for an upcoming/future meeting (e.g., a meeting not yet terminated or canceled). The in-flight event data stream 410 comprises information relating to the meeting, such as an electronic meeting invitation for the meeting and one or more meeting invitation responses received, up to a particular point in time, from one or more invitees to the meeting.

The attendance predictor module 450 is configured to apply the best segmentation algorithm to the in-flight event data stream 410 to produce k segments of time between when the meeting invitation was sent out to invitees and either when the meeting is scheduled to start or when a meeting room assignment for the meeting must be confirmed. Based on the k segments of time, the attendance predictor module 450 is configured to compute, for each invitee who has not responded to the meeting invitation, each of the following: (1) an estimated probability of the invitee attending the meeting in-person (i.e., probability that the invitee is an in-person attendee), and (2) a corresponding confidence score for the estimated probability. Based on the meeting invitation responses received so far and each estimated probability and corresponding confidence score computed, the attendance predictor module 450 is configured to produce, as output, each of the following: (1) a predicted number of in-person attendees at the meeting (i.e., prediction of a final number of positive responses for the in-flight event data stream 410), and (2) a confidence score for the predicted number (i.e., confidence that the final number of positive responses will not exceed the predicted number).

In one embodiment, a confidence score corresponding to a predicted number of in-person attendees for a meeting comprises a confidence interval (e.g., a 95% confidence interval).

In one embodiment, when an event data stream 410 does not have the required number of segments k, the values at the ends of missing segments are assumed to be the same as the last value of an existing segment. For example, the value at the end of each segment may be a pair consisting of a number of positive responses and a number of invitees. If there are no meeting invitation responses and the number of invitees is n, then all values are <0, n>, independent of the best segmentation algorithm selected and the required number of segments k.

The system 200 further comprises a meeting room assignments unit 440 configured to tentatively assign a meeting room for a meeting, and subsequently confirm (i.e., freeze) the meeting room assignment, based on a predicted number of in-person attendees at the meeting and a confidence score for the predicted number. In one embodiment, the room assignments unit 440 tentatively assigns a meeting room for the meeting only when the confidence score (e.g., confidence interval) is within the pre-determined accuracy measure (e.g., within a 10% range of the number of invitees to the meeting).

In one embodiment, the room assignments unit 440 is configured to receive, as input, each of the following: (1) an in-flight (i.e., current) event data stream 410 for an upcoming/future meeting (e.g., a meeting not yet terminated or canceled), (2) a predicted number of in-person attendees (e.g., a predicted number of in-person attendees determined via the attendance predictor module 450), (3) a confidence score for the predicted number (e.g., a confidence score determined via the attendance predictor module 450), (4) a meeting room data structure 460, (5) a meeting room assignment algorithm (e.g., FCFS), and (6) a confirmation interval function (e.g., a user-specified/default deadline).

In one embodiment, the confirmation interval function (i.e., confirmation condition) is a temporal condition representing a deadline by, or an interval during, which a meeting room tentatively assigned for a meeting must be confirmed.

The confirmation interval function may be a function of a duration (i.e., period of delay) between when a meeting invitation to the meeting was sent and either when the meeting is scheduled to start or when a meeting room assignment for the meeting must be confirmed.

For example, the confirmation interval function may be satisfied upon expiry of a pre-specified period of delay after a meeting invitation to the meeting has been sent out. The confirmation interval function may be a user-specified confirmation interval function or a default confirmation interval function.

In one embodiment, based on the inputs received, the room assignments unit 440 is configured to apply the room assignment algorithm to produce, as an output, each of the following: (1) a tentative meeting room assignment for the meeting, where the tentative meeting room assignment identifies a meeting room that is tentatively assigned to the meeting, and (2) in response to satisfying the confirmation interval function (i.e., confirmation condition), a confirmed meeting room assignment for the meeting, where the confirmed meeting room assignment confirms a meeting room assigned to the meeting (i.e., sending confirmation of the assignment of the meeting room for the meeting to at least one invitee only after a period of delay defined by the confirmation condition has elapsed).

In one embodiment, the room assignment algorithm takes into account meeting room reservation requests that have higher priorities than other meeting room reservation requests, which may result in one or more changes to one or more tentative meeting room assignments. Meeting room reservation requests that have higher priorities may also be considered during the process of converting a tentative meeting room assignment to a confirmed meeting room assignment. A confirmed meeting room assignment is a final meeting room assignment that may only be altered manually.

In one embodiment, the room assignment algorithm takes into account a user-specified preferred/first choice meeting room for a meeting.

In one embodiment, when a meeting room is assigned for a meeting, a calendar time slot including a date, start time and an end time for the meeting is blocked on a calendar corresponding to the meeting room, such that the meeting room is unavailable to others during the blocked calendar time slot.

In one embodiment, only a confirmed meeting room assignment for a meeting is sent to at least one invitee to the meeting; a tentative meeting room assignment for the meeting is not sent to the invitee.

In the event that no adequate meeting rooms are available for the meeting, the room assignments unit 440 is configured to produce, as output, each of the following: (1) a tentative negative output, where the tentative negative output indicates that there are no adequate meeting rooms tentatively available for the meeting, and (2) in response to satisfying the confirmation interval function, a confirmed negative output, where the confirmed negative output confirms that no adequate meeting rooms are available for the meeting.

FIG. 3 illustrates an example event data stream 410, in accordance with an embodiment of the invention. The event data stream 410 may be a historical event data stream 410 or an in-flight event data stream 410. The event data stream 410 comprises information relating to a corresponding meeting, such as an electronic meeting invitation for the meeting, and one or more meeting invitation responses received from one or more invitees to the meeting.

In one example implementation, the event data stream 410 comprises multiple data fields, such as a first data field 411 comprising an event data stream identification (ID), a second data field 412 comprising an event type, a third data field 413 comprising a timestamp for each meeting invitation response, a fourth data field 414 comprising a number of invitees to the meeting, a fifth data field 415 comprising a number of positive responses to an electronic meeting invitation for the meeting (i.e., number of invitees who have opted to attend the meeting in-person), a sixth data field 416 comprising a number of negative meeting invitation responses to the meeting invitation (i.e., number of invitees who are absentees or have opted to not attend the meeting in-person), a seventh data field 417 comprising a timestamp for the meeting invitation (i.e., when the meeting invitation was sent out to invitees), and an eighth data field 418 comprising a timestamp for the meeting (i.e., when the meeting is scheduled to start). In one example implementation, an event type may be one of the following: an electronic meeting invitation for a meeting, a positive meeting invitation response to an electronic meeting invitation for a meeting, a negative meeting invitation response to an electronic meeting invitation for a meeting, or a meeting.

In another embodiment, a last data field/entry of a historical event data stream 410 includes a report identifying an actual number of in-person attendees at the meeting; this report may replace the number of positive responses to an electronic meeting invitation for the meeting.

In one embodiment, the event data stream 410 may be represented as a vector, where each element of the vector corresponds to a data field of the dataset 410.

FIG. 4 illustrates an example database 400 maintaining historical meeting information, in accordance with an embodiment of the invention. A portion of the database 400 shown in FIG. 4 includes multiple rows, where each row represents a historical event data stream 410. Specifically, the rows comprise meeting invitation responses received from different invitees to the same meeting.

As shown in FIG. 4, each row includes the same event data stream ID (e.g., Meeting ID set to "M64"), the same event type (e.g., Meeting Type set to "brain storming"), the same timestamp for a meeting invitation for the meeting (e.g., Invitation Date set to "12/9/2014 14:00"), and the same timestamp for the meeting (e.g., Meeting Start Date set to "12/16/2014 14:00"). Further, each row comprises a meeting invitation response (e.g., Response set to either "true" or "false" representing a positive response or a negative response, respectively), an ID corresponding to an invitee that the meeting invitation response was received from (e.g., User ID set to "user8", etc.), and a timestamp for the meeting invitation response (e.g., Response Date set to "12/9/2014 15:00", etc.)

FIG. 5 illustrates an example meeting room data structure 460, in accordance with an embodiment of the invention. As shown in FIG. 5, the meeting room data structure 460 corresponds to a set of different meeting rooms (e.g., Room 1, Room 2, . . . , Room 10), and includes information relating to the meeting rooms, such as a fixed room capacity of each meeting room (e.g., fixed room capacity for Room 1, Room 2 and Room 3 is 6).

Figure 6:
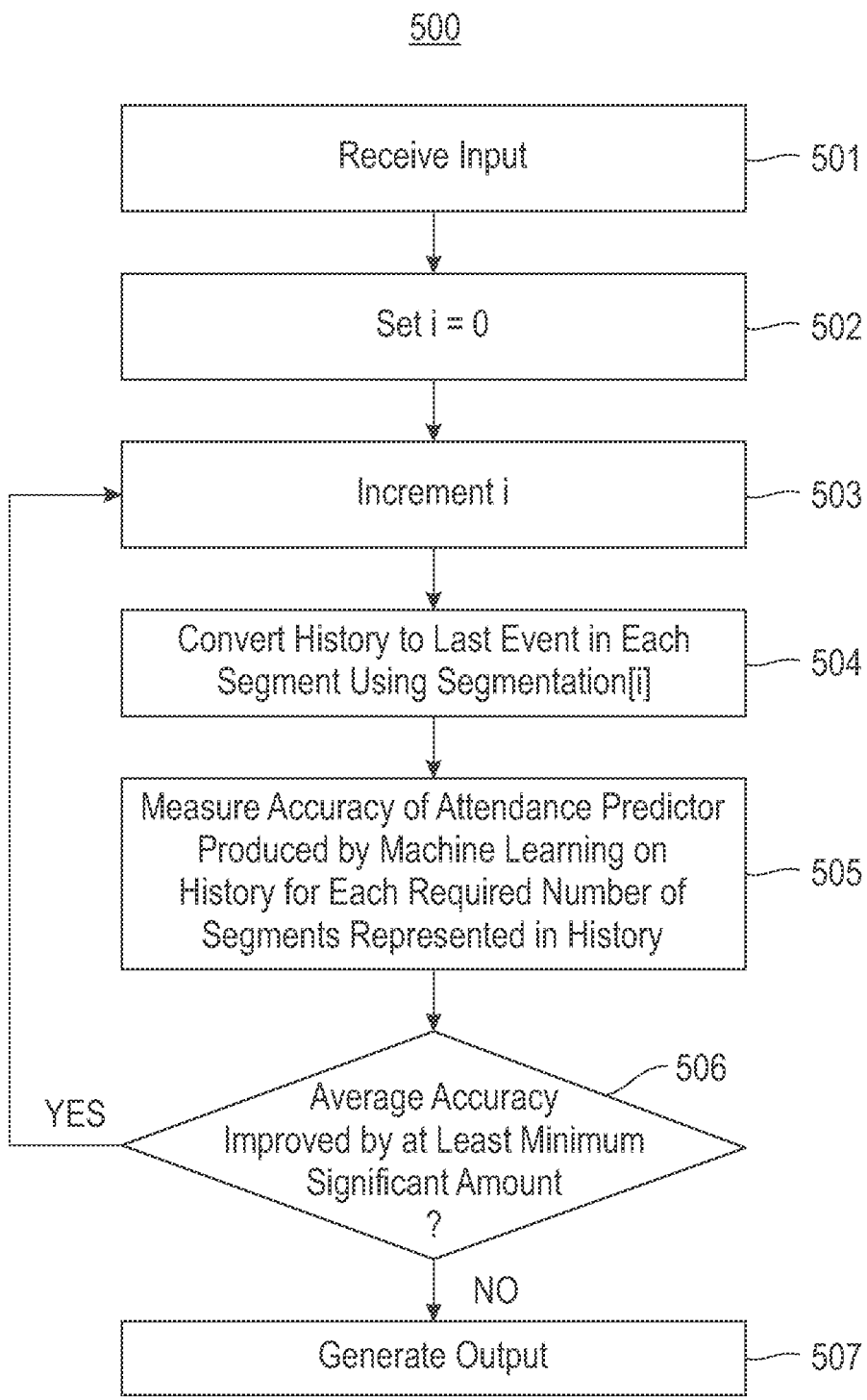
FIG. 6 illustrates a flowchart of an example process for producing the attendance predictor module, in accordance with an embodiment of the present invention.

FIG. 6 illustrates a flowchart of an example process 500 for producing the attendance predictor module 450, in accordance with an embodiment of the present invention. In process block 501, receive input, such as a pre-determined accuracy measure (e.g., precision), a set (i.e., family) of segmentation algorithms, a set of historical event data streams 410, a confirmation interval function, and a pre-determined minimum significant accuracy improvement threshold. In process block 502, set i to 0, where i is used to index the set of segmentation algorithms. In process block 503, increment i. In process block 504, convert history to last event in each segment (i.e., select the last event if there are multiple events in the segment) using segmentation[i], where segmentation[i] denotes an $i^{th}$ segmentation algorithm in the set of segmentation algorithms. In process block 505, measure accuracy of a predicted number of in-person attendees based on the pre-determined accuracy measure. In process block 506, determine if average accuracy is improved by at least the pre-determined minimum significant accuracy improvement threshold. If the average accuracy is improved, return to process block 503. If the average accuracy has not improved, segmentation[i] is the best segmentation algorithm and proceed to process block 507. In process block 507, output is generated, such as the attendance predictor module 450, the best segmentation algorithm, and a required number of segments k.

In one embodiment, process blocks 501-507 may be executed utilizing the learning unit 430.

In another embodiment, the learning unit 430 produces the attendance predictor module 450 based on individual history datasets 420 maintained in the database 400.

In this specification, let $v_i$ denote a meeting, where i=1, . . . , m. Let $u_j$ denote a user, where j=1, . . . , n. Let $t_2^i$ or $x_1^i$ denote a start time of meeting i. Let $x_2^i$ denote a day of meeting i. Let $x_3^i$ denote a meeting type (e.g., brainstorming, talk, progress check, etc.) of meeting i. Let $t_0^i$ denote a time when an electronic meeting invitation for meeting i was sent to users (i.e., invitees). Let $t_1^{i,j}$ denote a time when user $u_j$ provides a positive response for meeting i (i.e., user $u_j$ responds that he/she will attend meeting i in-person). Let $x^i$ denote a vector for meeting i, where $x^i \epsilon R^3$. Let $y^{i,j}$ denote a meeting invitation response for meeting i from user $u_j$, where $y^{i,j}$ is 1 if user $u_j$ responds that he/she will attend meeting i in-person, and 0 otherwise. Let $M^j$ denote an index of different meetings that user j has been invited to.

As stated above, in one embodiment, a confidence score corresponding to a predicted number of in-person attendees for a meeting comprises a confidence interval (e.g., a 95% confidence interval). The attendance predictor module 450 is configured to compute a confidence interval for a predicted number of in-person attendees for a meeting in accordance with equation (1) provided below:

$$\Sigma_{j=1}^{n_i} \hat{p}^{i,j} \pm z_{1-\alpha/2} \sigma^i \qquad (1),$$

where $z_{1-\alpha/2}$ denotes a $$100\left(1 - \frac{\alpha}{2}\right) - th$$

percentile of standard normal distribution. If the computed confidence interval is within a pre-determined accuracy measure (e.g., within a 10% range of the number of invitees to the meeting), the predicted number of in-person attendees is considered to be as close to accurate as possible, and the room assignments unit 440 produces, as an output, a meeting room assignment based in part on the predicted number of in-person attendees.

Figure 7:
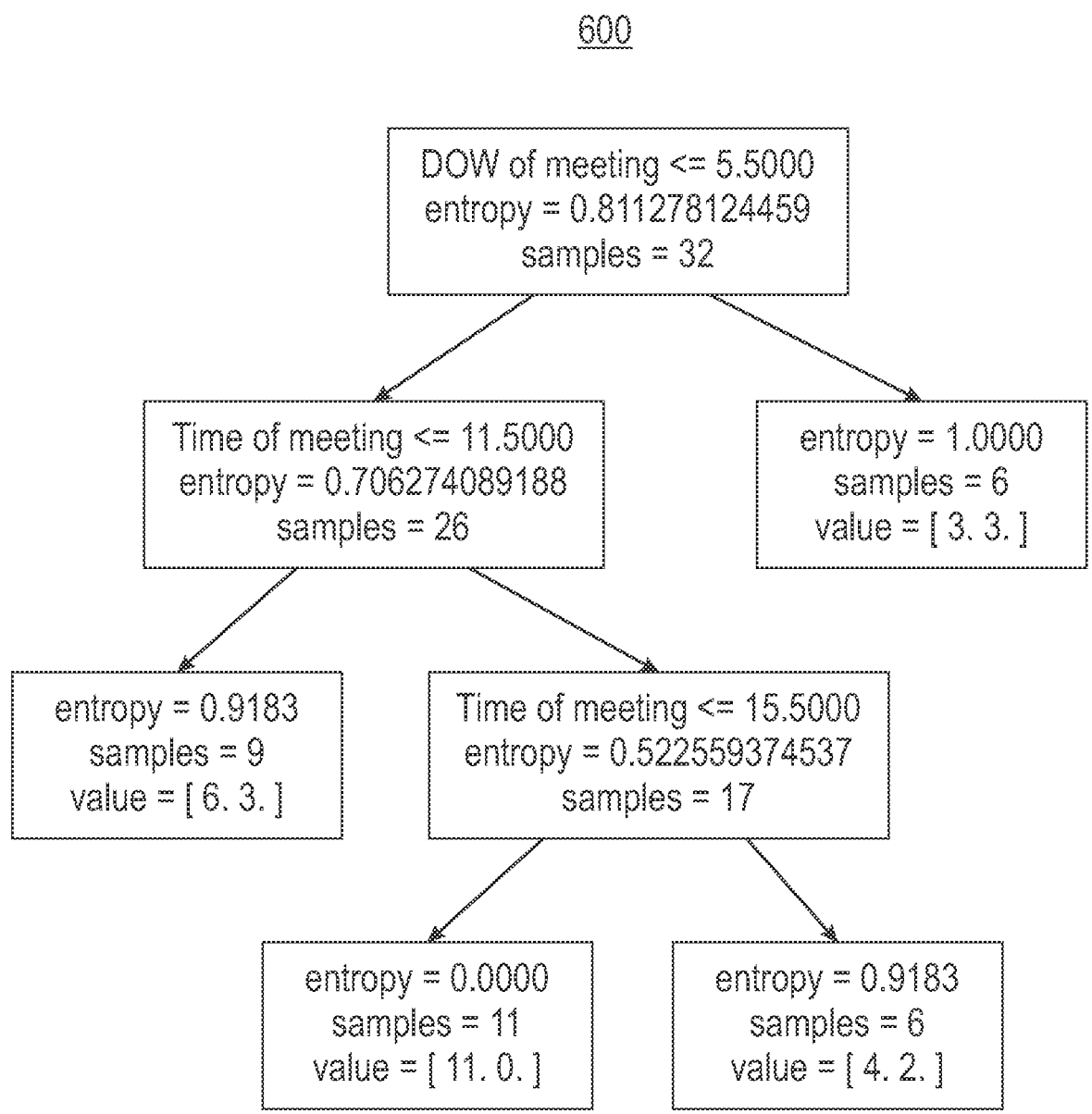
FIG. 7 illustrates an example decision tree for a user, in accordance with an embodiment of the invention.

FIG. 7 illustrates an example decision tree 600 for user $u_j$, in accordance with an embodiment of the invention. In one embodiment, the attendance predictor module 450 is configured to estimate probability of user $u_j$ attending meeting i in-person. The attendance predictor module 450 produced by the learning unit 430 is trained to learn, for each user $u_j$, hypothesis $y^{i,j} = h_j(x)$ from a decision tree for user $u_j$, where i=1, ..., [$M^j$]. For a given meeting $v_i$, the attendance predictor module 450 estimates probability $\hat{p}^{i,j}$ of user $u_j$ attending meeting $v_i$ in-person. For each estimated probability $\hat{p}^{i,j}$, the attendance predictor module 450 is configured to compute a standard deviation $\sigma^{i,j}$ in accordance with equation (2) provided below:

$$\sigma^{i,j} = \sqrt{\frac{\hat{p}^{i,j}(1-\hat{p}^{i,j})}{n^j}}, \quad (2)$$

where $n^j$ denotes number of data points included in a final node of the decision tree for user $u_j$.

The attendance predictor module 450 is configured to compute a standard deviation $\sigma^i$ for all users invited to meeting i in accordance with equation (3) provided below:

$$\sigma^i = \sqrt{\sum_{j=1}^{n_i} \frac{\hat{p}^{i,j}(1-\hat{p}^{i,j})}{n^j}}. \quad (3)$$

Figure 8A:
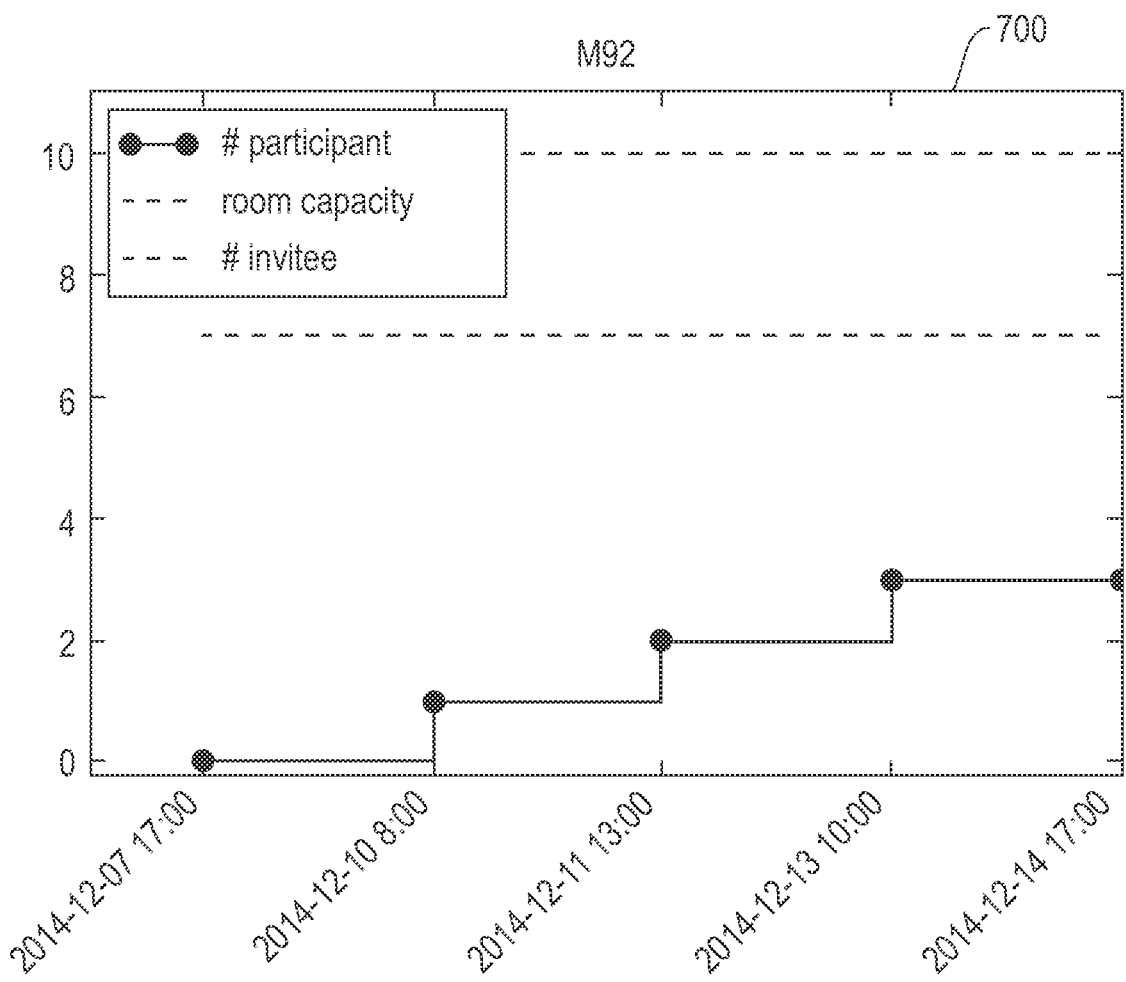
FIG. 8A illustrates a first time timeline representing actual meeting invitation responses, in accordance with an embodiment of the invention.
Figure 8B:
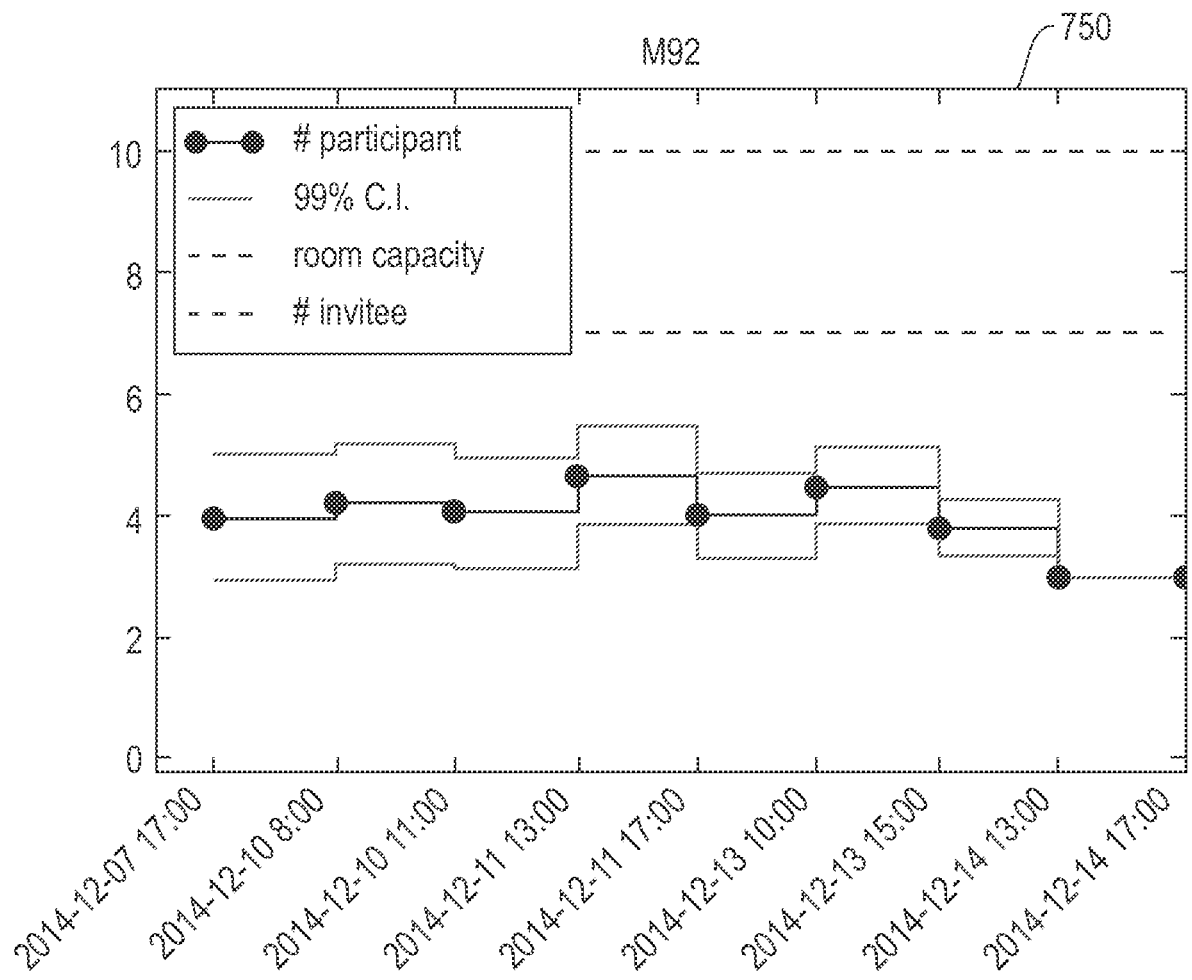
FIG. 8B illustrates a second timeline representing estimated meeting invitation responses, in accordance with an embodiment of the invention.

FIG. 8A illustrates a first time timeline 700 representing actual meeting invitation responses for a meeting, in accordance with an embodiment of the invention. FIG. 8B illustrates a second timeline 750 representing estimated meeting invitation responses for the same meeting in FIG. 8A, in accordance with an embodiment of the invention. As shown in timeline 750, a confidence interval decreases as more actual meeting invitation responses (FIG. 8A) are received from invitees.

FIG. 9 illustrates an example table 800 comparing a greedy approach and a stochastic approach to meeting room assignment, in accordance with an embodiment of the invention. The system 200 implements a stochastic approach to meeting room assignment. As shown in FIG. 9, the stochastic approach decreases waste of room capacity by about a factor of 3.

Figure 10:
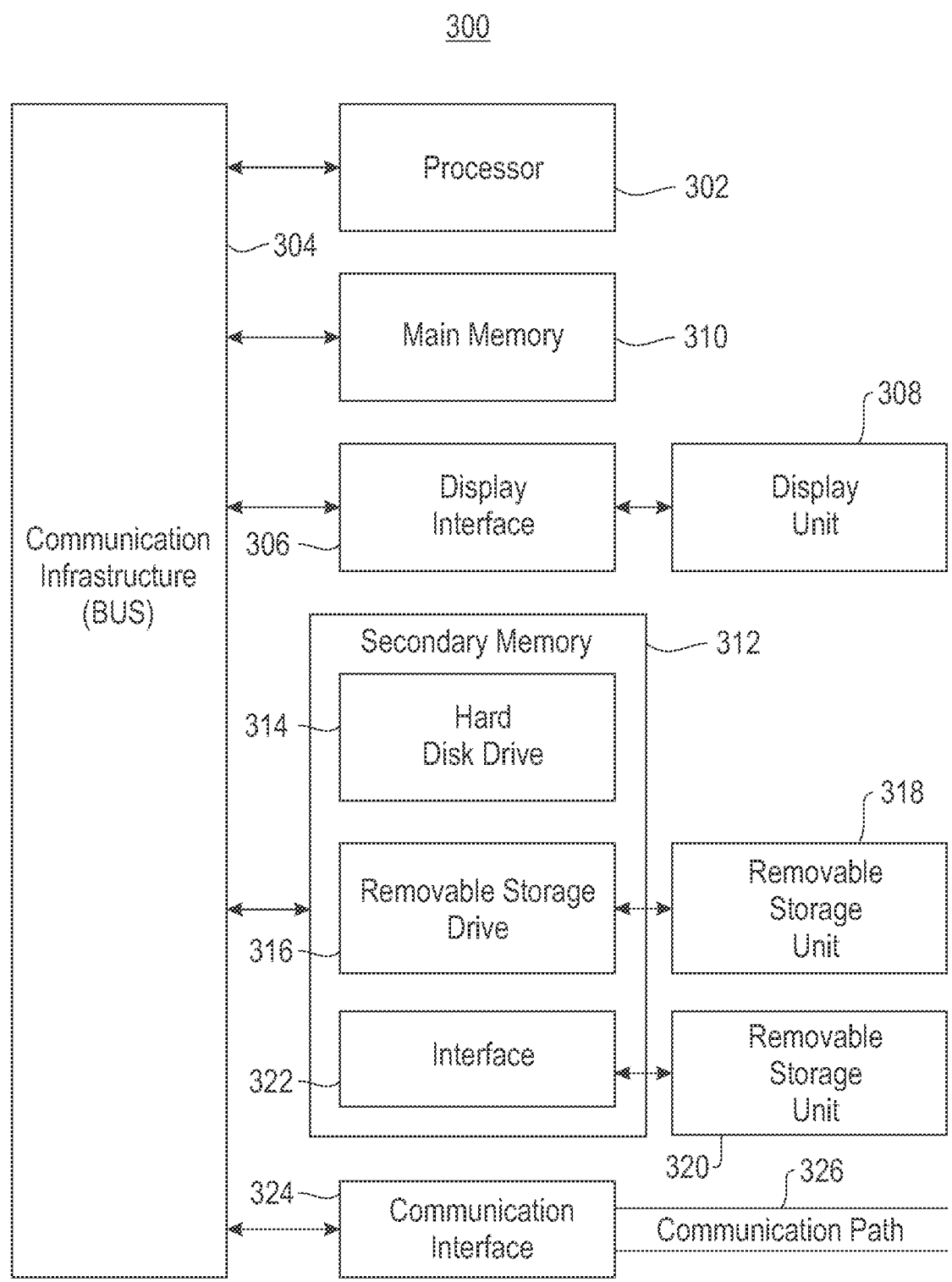
FIG. 10 is a high level block diagram showing an information processing system useful for implementing one embodiment of the invention.

FIG. 10 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

maintaining historical meeting information on at least one hardware storage device;

applying a first segmentation algorithm from a set of segmentation algorithms to the historical meeting information, wherein the set of segmentation algorithms is indexed by an index value, and the index value is set to an integer value that denotes the first segmentation algorithm;

training an attendance predictor module by applying machine learning to segments of the historical meeting information resulting from the first segmentation algorithm;

measuring accuracy of the attendance predictor module;

improving the accuracy of the attendance predictor module via a process comprising:

incrementing the index value;

applying a different segmentation algorithm from the set of segmentation algorithms to the historical meeting information, wherein the incremented index value denotes the different segmentation algorithm;

further training the attendance predictor module by applying the machine learning to different segments of the historical meeting information resulting from the different segmentation algorithm;

determining whether the accuracy of the attendance predictor module is improved by at least a pre-determined minimum accuracy improvement threshold;

when the accuracy of the attendance predictor module is improved by at least the pre-determined minimum accuracy improvement threshold, repeating the process, such that the accuracy of the attendance predictor module is repeatedly improved until the accuracy of the attendance predictor module is no longer improved by at least the pre-determined minimum accuracy improvement threshold; and when the accuracy of the attendance predictor module is not improved by at least the pre-determined minimum accuracy improvement threshold, determining a required number of segments and selecting the different segmentation algorithm as a best segmentation algorithm from the set of segmentation algorithms;

receiving an event data stream corresponding to a meeting, wherein the event data stream comprises an electronic meeting invitation for the meeting and one or more meeting invitation responses received from one or more invitees to the meeting, and each invitee is provided with multiple options of attending the meeting, the multiple options including an option of attending the meeting in-person;

segmenting the event data stream into the required number of segments using the best segmentation algorithm;

in response to receiving the electronic meeting invitation, initiating a period of delay during which confirmation of an assignment of a meeting room for the meeting is delayed, wherein the period of delay ends when a confirmation condition occurs;

preventing an overestimation of required room capacity for the meeting and reducing waste of room capacity for the meeting by implementing a stochastic approach to the assignment of the meeting room for the meeting, wherein the stochastic approach comprises predicting, utilizing the attendance predictor module executing on a hardware processor, a number of in-person attendees at the meeting based on the event data stream and the historical meeting information, wherein the attendance predictor module is trained to predict, using the best segmentation algorithm, a probability of each invitee attending the meeting in-person, and the predicted number of in-person attendees has a corresponding confidence score that is based on each predicted probability of each invitee attending the meeting in-person and a standard deviation for all invitees to the meeting;

in response to determining the corresponding confidence score is within a pre-specified range, tentatively assigning a first room from a set of meeting rooms as the meeting room for the meeting based on the predicted number of in-person attendees;

in response to receiving, from an electronic device, a request to reserve the first room for a different meeting with a higher priority than the meeting, making one or more changes to the assignment of the meeting room for the meeting;

sending the confirmation of the assignment of the meeting room for the meeting to at least one electronic device of at least one invitee to the meeting only after the period of delay has elapsed, wherein the confirmation confirms the meeting room is a most recent room tentatively assigned to the meeting at the end of the period of delay; and adjusting a meeting room data structure maintained on the at least one hardware storage device by blocking a time slot corresponding to the meeting on a calendar for the meeting room included in the meeting room data structure, such that the meeting room is unavailable for another meeting during the blocked time slot.

2. The method of claim 1, wherein:

the historical meeting information comprises multiple historical event data streams;

each historical event data stream corresponds to a meeting that had previously occurred; and each historical event data stream comprises at least one of: an electronic meeting invitation for a corresponding meeting, and one or more meeting invitation responses received from specific invitees to the corresponding meeting.

3. The method of claim 1, wherein:

the historical meeting information comprises multiple individual history datasets;

each individual history dataset corresponds to a user; and each individual history dataset comprises at least one of: one or more electronic meeting invitations received by a corresponding user, and one or more meeting invitation responses received from the corresponding user.

4. The method of claim 1, wherein the multiple options further include another option of attending the meeting virtually.

5. The method of claim 1, wherein a meeting invitation response received from an invitee is one of: a positive response indicating the invitee will attend the meeting in-person, or a negative response indicating the invitee will not attend the meeting in-person.

6. The method of claim 1, wherein the confirmation condition is a temporal condition.

7. The method of claim 1, wherein the blocked time slot includes a date, a start time, and an end time for the meeting.

8. The method of claim 1, further comprising:

estimating, utilizing the attendance predictor module, the corresponding confidence score based on the event data stream and the historical meeting information.

9. The method of claim 8, wherein:
the standard deviation for all invitees is based on each standard deviation for each invitee, and each standard deviation for each invitee is based on a probability of each invitee attending the meeting in-person.

10. The method of claim 3, further comprising:
determining, for each invitee to the meeting, a corresponding individual propensity of attending the meeting based on the event data stream and the historical meeting information, wherein the historical meeting information includes one or more individual history datasets corresponding to each invitee; and
estimating, utilizing the attendance predictor module, the corresponding confidence score based the corresponding individual propensity of attending the meeting.

11. The method of claim 10, wherein:
the standard deviation for all invitees is based on each standard deviation for each invitee, and each standard deviation for each invitee is based on the corresponding individual propensity of attending the meeting.

12. The method of claim 1, wherein:
the meeting room data structure corresponds to the set of meeting rooms;
the meeting room data structure comprises, for each meeting room of the set of meeting rooms, at least one of: room capacity information for the meeting room, and a calendar for the meeting room; and
the meeting room is tentatively assigned to the meeting further based on the meeting room data structure.

13. A system comprising a computer processor, a non-transitory computer-readable storage medium, and program code embodied in the non-transitory computer-readable storage medium for execution by the computer processor to implement:
maintaining historical meeting information on at least one hardware storage device;
applying a first segmentation algorithm from a set of segmentation algorithms to the historical meeting information, wherein the set of segmentation algorithms is indexed by an index value, and the index value is set to an integer value that denotes the first segmentation algorithm;
training an attendance predictor module by applying machine learning to segments of the historical meeting information resulting from the first segmentation algorithm;
measuring accuracy of the attendance predictor module;
improving the accuracy of the attendance predictor module via a process comprising:
incrementing the index value;
applying a different segmentation algorithm from the set of segmentation algorithms to the historical meeting information, wherein the incremented index value denotes the different segmentation algorithm;
further training the attendance predictor module by applying the machine learning to different segments of the historical meeting information resulting from the different segmentation algorithm;
determining whether the accuracy of the attendance predictor module is improved by at least a pre-determined minimum accuracy improvement threshold;
when the accuracy of the attendance predictor module is improved by at least the pre-determined minimum accuracy improvement threshold, repeating the process, such that the accuracy of the attendance predictor module is repeatedly improved until the accuracy of the attendance predictor module is no longer improved by at least the pre-determined minimum accuracy improvement threshold; and
when the accuracy of the attendance predictor module is not improved by at least the pre-determined minimum accuracy improvement threshold, determining a required number of segments and selecting the different segmentation algorithm as a best segmentation algorithm from the set of segmentation algorithms;
receiving an event data stream corresponding to a meeting, wherein the event data stream comprises an electronic meeting invitation for the meeting and one or more meeting invitation responses received from one or more invitees to the meeting, and each invitee is provided with multiple options of attending the meeting, the multiple options including an option of attending the meeting in-person;
segmenting the event data stream into the required number of segments using the best segmentation algorithm;
in response to receiving the electronic meeting invitation, initiating a period of delay during which confirmation of an assignment of a meeting room for the meeting is delayed, wherein the period of delay ends when a confirmation condition occurs;
preventing an overestimation of required room capacity for the meeting and reducing waste of room capacity for the meeting by implementing a stochastic approach to the assignment of the meeting room for the meeting, wherein the stochastic approach comprises predicting, utilizing the attendance predictor module executed by the computer processor, a number of in-person attendees at the meeting based on the event data stream and the historical meeting information, wherein the attendance predictor module is trained to predict, using the best segmentation algorithm, a probability of each invitee attending the meeting in-person, and the predicted number of in-person attendees has a corresponding confidence score that is based on each predicted probability of each invitee attending the meeting in-person and a standard deviation for all invitees to the meeting;
in response to determining the corresponding confidence score is within a pre-specified range, tentatively assigning a first room from a set of meeting rooms as the meeting room for the meeting based on the predicted number of in-person attendees;
in response to receiving, from an electronic device, a request to reserve the first room for a different meeting with a higher priority than the meeting, making one or more changes to the assignment of the meeting room for the meeting;
sending the confirmation of the assignment of the meeting room for the meeting to at least one electronic device of at least one invitee to the meeting only after the period of delay has elapsed, wherein the confirmation confirms the meeting room is a most recent room tentatively assigned to the meeting at the end of the period of delay; and
adjusting a meeting room data structure maintained on the at least one hardware storage device by blocking a time slot corresponding to the meeting on a calendar for the meeting room included in the meeting room data structure, such that the meeting room is unavailable for another meeting during the blocked time slot.

14. The system of claim 13, wherein:
the historical meeting information comprises multiple historical event data streams;
each historical event data stream corresponds to a meeting that had previously occurred; and
each historical event data stream comprises at least one of: an electronic meeting invitation for a corresponding meeting, and one or more meeting invitation responses received from specific invitees to the corresponding meeting.

15. The system of claim 13, wherein:
the historical meeting information comprises multiple individual history datasets;
each individual history dataset corresponds to a user; and
each individual history dataset comprises at least one of: one or more electronic meeting invitations received by a corresponding user, and one or more meeting invitation responses received from the corresponding user.

16. The system of claim 13, wherein the multiple options further include another option of attending the meeting virtually.

17. The system of claim 13, wherein a meeting invitation response received from an invitee is one of: a positive response indicating the invitee will attend the meeting in-person, or a negative response indicating the invitee will not attend the meeting in-person.

18. The system of claim 13, wherein the confirmation condition is a temporal condition.

19. The system of claim 13, wherein the blocked time slot includes a date, a start time, and an end time for the meeting.

20. The system of claim 13, wherein the program code embodied in the non-transitory computer-readable storage medium for execution by the computer processor further implements:
estimating, utilizing the attendance predictor module, the corresponding confidence score based on the event data stream and the historical meeting information.

21. The system of claim 20, wherein:
the standard deviation for all invitees is based on each standard deviation for each invitee, and each standard deviation for each invitee is based on a probability of each invitee attending the meeting in-person.

22. The system of claim 15, wherein the program code embodied in the non-transitory computer-readable storage medium for execution by the computer processor further implements:
determining, for each invitee to the meeting, a corresponding individual propensity of attending the meeting based on the event data stream and the historical meeting information, wherein the historical meeting information includes one or more individual history datasets corresponding to each invitee; and
estimating, utilizing the attendance predictor module, the corresponding confidence score based the corresponding individual propensity of attending the meeting.

23. The system of claim 22, wherein:
the standard deviation for all invitees is based on each standard deviation for each invitee, and each standard deviation for each invitee is based on the corresponding individual propensity of attending the meeting.

24. The system of claim 13, wherein:
the meeting room data structure corresponds to the set of meeting rooms;
the meeting room data structure comprises, for each meeting room of the set of meeting rooms, at least one of: room capacity information for the meeting room, and a calendar for the meeting room; and
the meeting room is tentatively assigned to the meeting further based on the meeting room data structure.

25. A non-transitory computer-readable storage medium having program code embodied therewith, the program code being executable by a computer processor for:
maintaining historical meeting information;
applying a first segmentation algorithm from a set of segmentation algorithms to the historical meeting information, wherein the set of segmentation algorithms is indexed by an index value, and the index value is set to an integer value that denotes the first segmentation algorithm;
training an attendance predictor module by applying machine learning to segments of the historical meeting information resulting from the first segmentation algorithm;
measuring accuracy of the attendance predictor module;
improving the accuracy of the attendance predictor module via a process comprising:
incrementing the index value;
applying a different segmentation algorithm from the set of segmentation algorithms to the historical meeting information, wherein the incremented index value denotes the different segmentation algorithm;
further training the attendance predictor module by applying the machine learning to different segments of the historical meeting information resulting from the different segmentation algorithm;
determining whether the accuracy of the attendance predictor module is improved by at least a pre-determined minimum accuracy improvement threshold;
when the accuracy of the attendance predictor module is improved by at least the pre-determined minimum accuracy improvement threshold, repeating the process, such that the accuracy of the attendance predictor module is repeatedly improved until the accuracy of the attendance predictor module is no longer improved by at least the pre-determined minimum accuracy improvement threshold; and
when the accuracy of the attendance predictor module is not improved by at least the pre-determined minimum accuracy improvement threshold, determining a required number of segments and selecting the different segmentation algorithm as a best segmentation algorithm from the set of segmentation algorithms;
receiving an event data stream corresponding to a meeting, wherein the event data stream comprises an electronic meeting invitation for the meeting and one or more meeting invitation responses received from one or more invitees to the meeting, and each invitee is provided with multiple options of attending the meeting, the multiple options including an option of attending the meeting in-person;
segmenting the event data stream into the required number of segments using the best segmentation algorithm;
in response to receiving the electronic meeting invitation, initiating a period of delay during which confirmation of an assignment of a meeting room for the meeting is delayed, wherein the period of delay ends when a confirmation condition occurs;
preventing an overestimation of required room capacity for the meeting and reducing waste of room capacity for the meeting by implementing a stochastic approach to the assignment of the meeting room for the meeting, wherein the stochastic approach comprises predicting, utilizing the attendance predictor module, a number of in-person attendees at the meeting based on the event data stream and the historical meeting information, wherein the attendance predictor module is trained to predict, using the best segmentation algorithm, a probability of each invitee attending the meeting in-person, and the predicted number of in-person attendees has a corresponding confidence score that is based on each predicted probability of each invitee attending the meeting in-person and a standard deviation for all invitees to the meeting;

in response to determining the corresponding confidence score is within a pre-specified range, tentatively assigning a first room from a set of meeting rooms as the meeting room for the meeting based on the predicted number of in-person attendees;

in response to receiving, from an electronic device, a request to reserve the first room for a different meeting with a higher priority than the meeting, making one or more changes to the assignment of the meeting room for the meeting;

sending the confirmation of the assignment of the meeting room for the meeting to at least one electronic device of at least one invitee to the meeting only after the period of delay has elapsed, wherein the confirmation confirms the meeting room is a most recent room tentatively assigned to the meeting at the end of the period of delay; and adjusting a meeting room data structure by blocking a time slot corresponding to the meeting on a calendar for the meeting room included in the meeting room data structure, such that the meeting room is unavailable for another meeting during the blocked time slot.

* * * * *